Aug. 27, 1940.    W. C. DOWNING, JR    2,212,730
THERMAL METERING APPARATUS
Filed Oct. 27, 1939    2 Sheets-Sheet 1
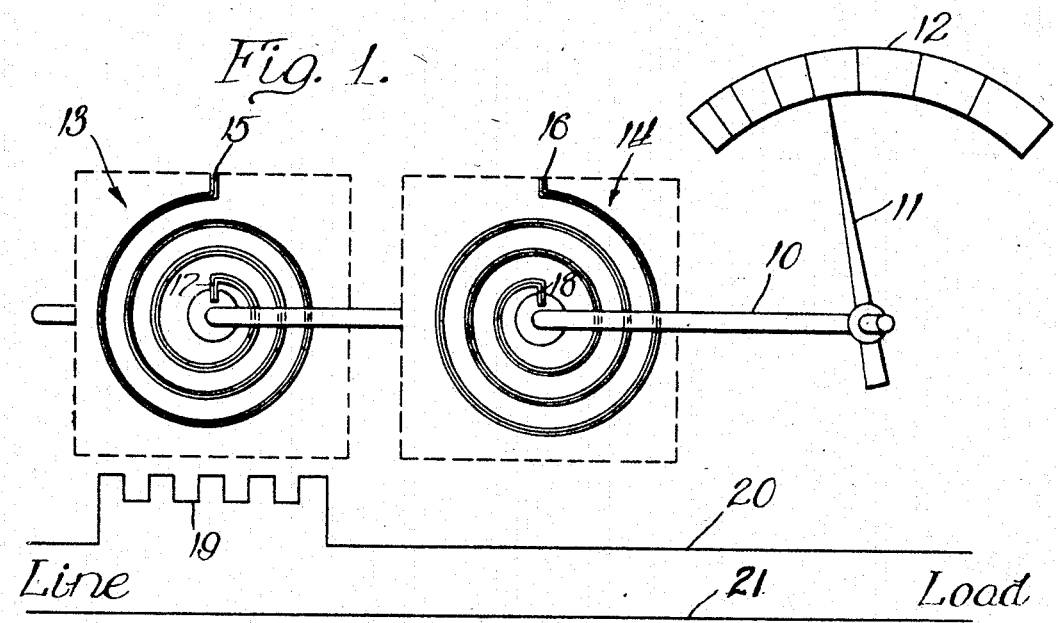
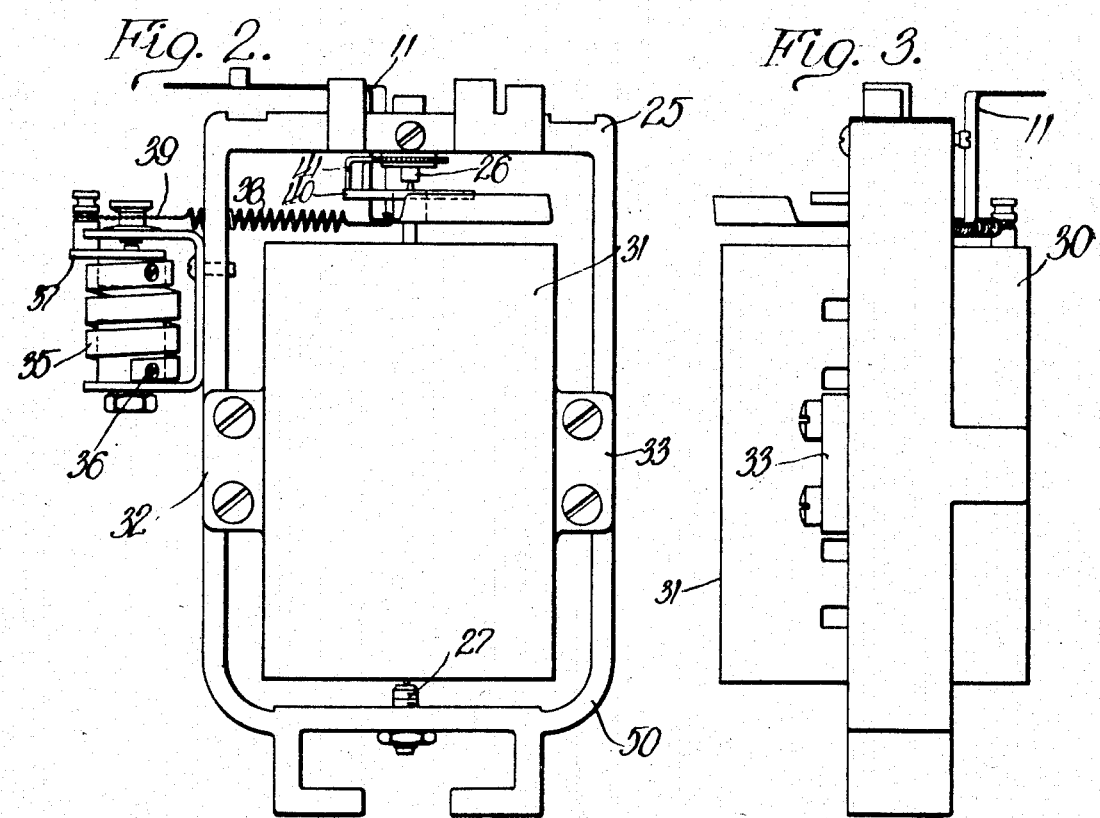
Inventor:
William C. Downing Jr.

Aug. 27, 1940.   W. C. DOWNING, JR   2,212,730
THERMAL METERING APPARATUS
Filed Oct. 27, 1939    2 Sheets-Sheet 2
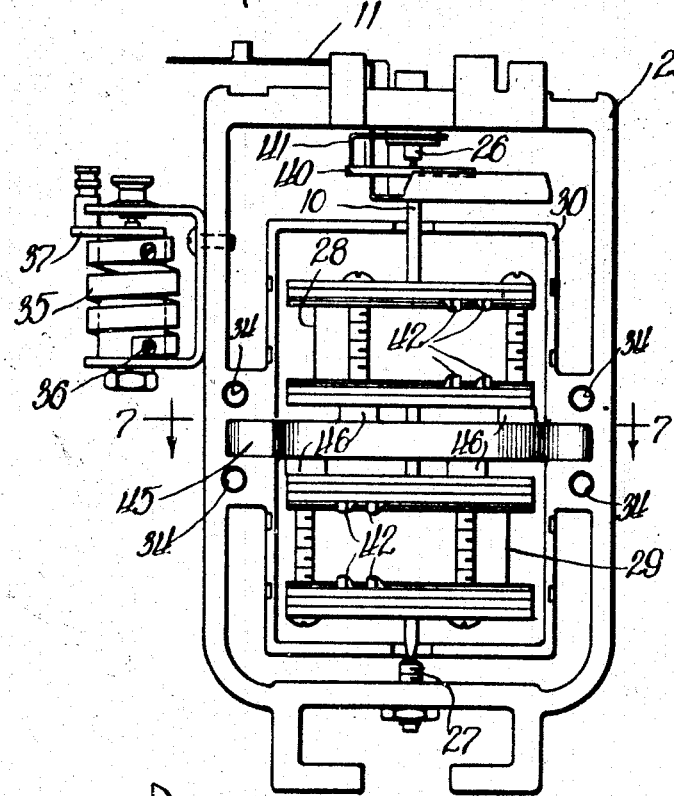
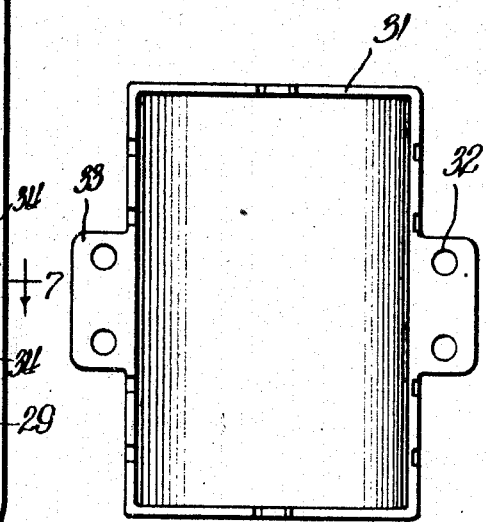
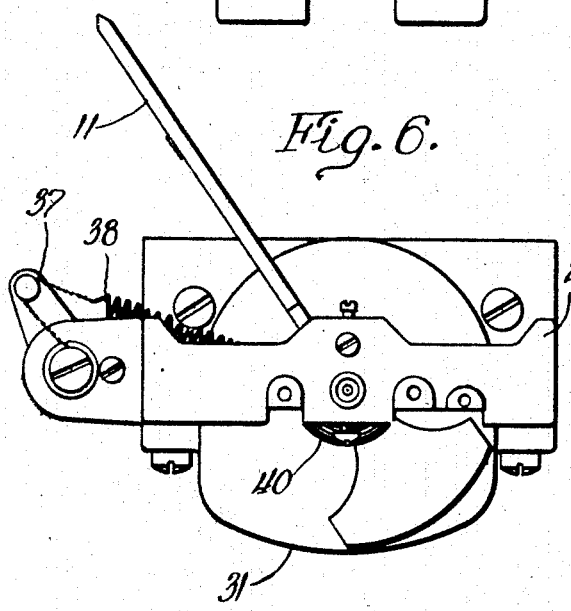
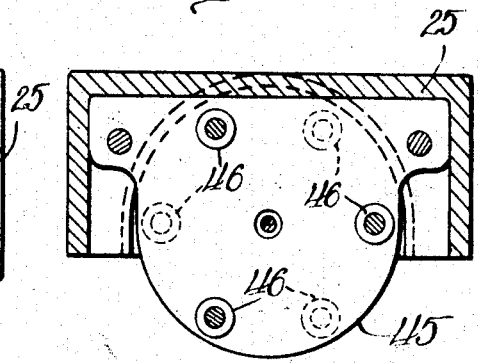
Inventor:
William C. Downing, Jr.
By Brown Jackson Boettcher Dienner
Attys.

Patented Aug. 27, 1940

2,212,730

UNITED STATES PATENT OFFICE 2,212,730

THERMAL METERING APPARATUS

William C. Downing, Jr., Springfield, Ill., assignor to Lincoln Meter Company, Inc., Springfield, Ill., a corporation of Illinois Application October 27, 1938, Serial No. 237,235

3 Claims. (Cl. 171—95)

My invention relates, generally, to electrical measuring devices and has particular relation to indicating thermal demand meters in which electrical energy is converted into heat energy which ultimately causes a mechanical deflection proportional to a function of the quantity to be metered.

The principle of operation and construction of thermal demand meters are relatively simple. A thermal demand meter comprises a pair of oppositely wound bimetallic coils, the outer ends of which are fixed to the meter frame or other anchoring place and the inner ends are joined to a shaft which carries a pointer that cooperates with a scale for indicating the quantity being measured. If desired, the meter may be made into a continuous recorder by providing a pen on the pointer which inks a suitable recording chart.

The fundamental principle made use of is that a bimetallic coil expands and contracts with changes in temperature. As long as the temperature of the two oppositely wound coils is the same, no motion of the shaft to which they are connected results, even though this temperature changes, since the tendency of each of the coils to expand with rising temperature just balances that of the other. However, when the temperature of one coil becomes either higher or lower than that of the other there results a deflection of the pointer carried by the shaft which is proportional to the temperature difference between the coils.

Each of the bimetallic coils is contained in an individual housing and one or both of these housings may be arranged to be electrically heated. Heat applied to a housing tends to raise the temperature of the housing and that of the bimetallic coil contained therein by an amount substantially proportional to the rate at which the heat is applied. Accordingly, the temperature difference between the housings, as measured by the bimetallic coils is closely proportional to the difference in the rate at which heat is supplied to the two housings, and will hereinafter be referred to simply as the "power input differential."

Various means, well known in the prior art, are employed to provide a power input differential which is proportional to or closely proportional to a function of the quantity to be measured by the meter. For example, in an instrument intended for measuring the current flow in a two wire circuit, only one housing is heated. The input differential in this case is simply the power input to the heated housing, and is proportional to the square of the current measured. The heating of the housing is accomplished by means of a non-inductive resistor which is connected directly in the circuit if the expected current flow is below a certain predetermined value and is indirectly connected in a circuit by means of a shunt or a transformer if the current flow in the circuit is expected to exceed this predetermined value.

Another example is that of a meter for measuring the flow of power in an electric power circuit. In this case heat is applied to both housings but at different rates so that the power input differential is closely proportional to the power flow it is intended to measure. Means for doing this are described in the prior art and are used in commercial instruments.

It will be apparent that no matter whether one or both of the housings are heated, the operation of the thermal demand meter is affected by the ambient temperature of the medium surrounding the housings. That is, the housings must be mounted in some sort of casing or other which in normal use will be subject to surrounding or ambient temperature change. In the past it has been the practice to provide external compensating means for overcoming the error due to this change in ambient temperature. One such means that has been employed comprises a bimetallic helix which is positioned outside of the housing and is connected to operate the shaft and pointer through a helical tension spring. Another method of compensating for changes in ambient temperature is described in my copending application, Serial No. 227,658, filed August 31, 1938. According to this method, the compensation may be brought about by properly proportioning the compositions of the alloys making up the bimetallic strips or coils which are secured to the pointer shaft. However, I have found that there still remains an important source of inaccuracy which as yet has not been compensated for.

In the above brief discussion of thermal demand meters, it has been assumed that both measuring elements i. e., the bimetallic coils, operate under identical conditions of ambient temperature. That is to say, that although the ambient temperature may change it will affect both housings with their bimetallic coils equally. Actually however this equalized temperature condition is not obtained for one or a number of reasons. Among these reasons for inequality of ambient temperature or thermal conditions may be included; potential losses in the meter; current losses in the meter; rapidly changing ambient temperature external to the meter; effect of radiation, such as sunlight, on the meter; and the external application of heat to the meter. Since any one of these factors tend to introduce errors in to the meter indications and readings, it is desirable to shield the actuating element, i. e., the bimetallic coils, to minimize the effect of these conditions.

It has been found that these factors tending to introduce errors into the meter indication can be compensated for by enclosing the two bimetallic coil housings in a metallic shield or casing. Since this casing or shield is a good thermal conductor, temperature gradients inside the shield due to outside heat are kept to a minimum, and hence the temperature surrounding the two housings is maintained substantially uniform and equal throughout. In principle this thermal shielding is similar to electrical or magnetic shielding by means of enclosures or housings of high electrical conductivity or high permeability. It is preferable, also, to employ a shield of low heat storage capacity to minimize transient temperature gradients within the enclosure when the disturbing conditions are varying. Thus it is preferable to use a metal shield as this will have both a high thermal conductivity and a low specific heat or heat storage capacity.

The object of my invention, generally stated, is to provide and construct a thermal demand meter of the type herein described in which the temperature sensitive bimetallic coils are subject to substantially equal and uniform ambient thermal conditions.

Accordingly, my invention is disclosed in the embodiment thereof shown in the accompanying drawings, and it comprises the features of construction, combination of elements and arrangement of parts which will be exemplified in the construction hereinafter set forth and the scope of the application which will be indicated by the appended claims.

For a more complete understanding of the nature and scope of my invention reference may be had to the following detailed description taken in connection with the accompanying drawings in which:

Figure 1 illustrates diagrammatically the actuating mechanism of my thermal demand meter;

Figure 2 is an elevational view of my thermal demand meter unit;

Figure 3 is an elevational view taken on the right side of Figure 2;

Figure 4 is a view similar to Figure 2 with the cover of the thermal shield removed;

Figure 5 is a view of the cover of the thermal shield;

Figure 6 is a top plan view of Figure 2; and

Figure 7 is a sectional view taken on line 7—7 of Figure 4.

Referring now to Figure 1 of the drawings, it will be observed that a shaft 10 is provided which carries a pointer 11 which is arranged to cooperate with a scale 12 in order to give an indication of the quantity being measured. The shaft 10 may be mounted for rotation on bearings as will be described hereinafter. In order to rotate the shaft 10 and cause a corresponding deflection of pointer 11, a pair of oppositely wound bimetallic coils, shown generally at 13 and 14, is provided. The coil 13 may be termed a driving element and the coil 14 may be termed the retarding element. The outer ends 15 and 16 of the elements 13 and 14 are secured to the meter frame, while the inner ends 17 and 18 are secured to the shaft 10. In the illustration shown in this figure a single heating element 19 is provided which will be placed in the housing surrounding the driving element 13. The heating element 19 comprises a non-inductive resistor which is connected in conductor 20 of a pair of conductors 20 and 21. The conductors 20 and 21 may be connected in either a direct current or an alternating current circuit.

It will be seen that when the bimetallic coil 13 is heated by the heating element 19 it will tend to straighten out and the end 17 secured to the shaft 10 will cause it to be rotated in a clockwise direction. Conversely, when the coil 13 cools it will tend to curl up and the shaft 10 will be rotated in a counterclockwise direction.

If the ambient temperature surrounding the housings for the bimetallic coils 13 and 14 changes, the degree of rotation of the shaft 10 will vary, even though the same load is being measured and the same heat is therefore being supplied by the heating element 19. However, it has been found that this variation in rotation and corresponding variation in the reading on the scale 12 can be compensated for by providing thermostatic means which are responsive to the change in ambient temperature. Also, as previously stated, this variation can be compensated for by providing bimetallic coils 13 and 14 which have a temperature-deflection which is not in direct proportion to change in temperature due to composition of the bimetals. That is, the deflection of the coils 13 and 14 may be correspondingly greater or less at one temperature than at another. Therefore, it will be seen that when the ambient temperature affects both of the bimetallic coils 13 and 14 equally, a change in reading due to change in ambient temperature can be compensated for quite satisfactorily. However, I have found that in actual operation the ambient temperature around each of the bimetallic coils 13 and 14 may not change equally. By employing my present invention, I have been able to substantially equalize the effect of change in ambient temperature on each of the bimetallic coils 13 and 14.

Reference may now be had particularly to Figures 2, 3, 4 and 5 in connection with which my invention will be more fully set forth. It will be observed that the reference character 25 designates a frame provided with upper and lower bearings 26 and 27 therein. The shaft 10 is carried by the bearings 26 and 27, as is more clearly shown in Figure 4. The bimetallic coils 13 and 14 are disposed in cylindrical housings 28 and 29 with the shaft 10 passing centrally therethrough. The frame 25 may be a casting and may have formed integrally therewith an open metallic casing 30. Preferably the casing 30 is generally in the form of one-half of a closed cylinder and symmetrically encloses a substantial portion of the housings 28 and 29. In order to completely encase the housings 28 and 29 another open metallic casing or cover 31 is provided as is shown in more detail in Figure 5. The plane sections of casing parts 30 and 31 correspond to each other and are adapted to fit together. Lugs or ears 32 and 33 are provided on the sides of the casing or cover 31 which have apertures therein which register with the screw holes 34 in the casting or frame 25. The casing 31 may be screwed in place as shown in Figures 2 and 3.

A metal helix 35 is carried on the frame 25, one end of which is secured at 36 and the other end of which carries a movable arm 37. It will be apparent that the arm 37 will be moved as the helix 35 straightens out and contracts with changes of temperature. The arm 37 may be operatively connected to the pointer 11 through a helical coil spring 38 as shown in Figures 2 and 6. In order to adjust the reading of the pointer 11 a coil spring 40 is provided, the inner end of which is secured to the shaft 10 and the outer end of which is secured to a rotatable member 41. By rotating or turning the member 41 the coil spring 40 can be tightened or loosened thereby adjusting the clockwise and counterclockwise tension on the shaft 10. The terminals of the heating elements enclosed in the housings 25 and 29 are brought out as indicated at 42 in Figure 4. The ends 42 serve as terminals and leads may be soldered or otherwise secured to them.

With a view to mounting the housings 28 and 29 in the casing 30, a plate is provided as indicated at 45 in Figure 7. The plate 45 is positioned in a rectangular recess in the casting or frame 25 and is preferably made of some insulating material such as Bakelite. The plate 45 is provided on either side with bosses 46 upon which the housings 28 and 29 can be mounted and fastened by screws as is more clearly shown in Figure 4.

In operation the ends or terminals 42 of the heating elements are connected as desired for whatever particular use the thermal demand meter is to be used, the metallic helix 35 is operatively connected to the coil spring 38 and the coil spring 40 is adjusted so that the pointer 11 will indicate the proper reading when the housings 28 and 29 are under equal ambient thermal conditions. By having the casings 30 and 31 completely surrounding and enclosing the housings or enclosures 28 and 29, as shown in Figures 2 and 3, the ambient temperature within the casings 30 and 31 and surrounding the housings 28 and 29 will be substantially uniform throughout. The casings 30 and 31 are made of relatively thin metal and therefore have high heat conductivity and low heat storage capacity or specific heat. Therefore, there will be no localized heating and the thermal conditions within the casings will be equalized. Any abnormal heating of one spot will be quickly spread over the entire casing.

If heat is applied to any particular part of the frame 25, as for example the corner 50, Figure 2, it will be seen that it will be conducted to the casings 30 and 31 at the ears 32 and 33. That is, no matter where heat may be applied to the frame 25 it must be conducted to the casings 30 and 31 at their center. Accordingly, since the heat must come in at the center, both housings 28 and 29 will be equally affected.

By thus providing a metallic casing around the housings 28 and 29 through which external heat can only enter at the center and be equally dissipated throughout, the accuracy of the thermal demand meter is greatly increased.

Since certain changes may be made in the foregoing embodiment of the invention without departing from the scope thereof, it is intended that all matter contained in the above description or shown in the accompanying drawings shall be interpreted as illustrative and not in a limiting sense.

I claim as my invention:

1. A thermal electric meter comprising, in combination, a pair of thermally responsive elements and indicating means cooperating therewith, means for applying heat to at least one of said elements in accordance with a varying characteristic of an electric circuit, a single metallic housing completely and closely enclosing both said elements, support means within said metallic housing for substantially symmetrically mounting said elements in spaced relation therein, and a metallic frame surrounding said housing and supporting the same at substantially symmetrically located positions whereby heat applied to said frame at any portion thereof is substantially uniformly distributed throughout said housing and the resulting ambient temperature of each of said elements is equalized.

2. A thermal electric meter comprising, in combination, a pair of generally cylindrically shaped thermally responsive units and indicating means cooperating therewith, means for applying heat to at least one of said elements in accordance with a varying characteristic of an electric circuit, a single generally cylindrical metallic housing completely and closely enclosing both said units, support means within said metallic housing for substantially symmetrically mounting said units in spaced coaxial relation therein, and a metallic frame encircling said housing and supporting the same from opposite sides thereof substantially equidistant from its ends whereby heat applied to said frame at any portion thereof is substantially uniformly distributed throughout said housing and the resulting ambient temperature of each of said units is substantially the same.

3. A thermal electric meter comprising, in combination, a pair of generally cylindrically shaped thermally responsive units and indicating means cooperating therewith, means for applying heat to at least one of said elements in accordance with a varying characteristic of an electric circuit, a single generally cylindrical metallic housing divided longitudinally to provide a support portion and a cover portion which together completely and closely enclose both said units, means within said support portion for substantially symmetrically mounting said units in spaced coaxial relation therein, and a generally rectangular metallic frame surrounding said support portion in spaced relation and integrally formed therewith on opposite sides substantially equidistant from its ends whereby heat applied to said frame at any portion thereof is substantially uniformly distributed throughout said housing and the resulting ambient temperature of each of said units is substantially the same.

WILLIAM C. DOWNING, Jr.